US005305870A

United States Patent [19]

Riesmeier

[11] Patent Number: 5,305,870

[45] Date of Patent: Apr. 26, 1994

[54] METHOD OF AND APPARATUS FOR TRANSPORTING LOOSELY BOUND BOOKS

[75] Inventor: Manfred Riesmeier, Rahden, Fed. Rep. of Germany

[73] Assignee: Kolbus GmbH & Co. KG, Rahden, Fed. Rep. of Germany

[21] Appl. No.: 20,626

[22] Filed: Feb. 22, 1993

[30] Foreign Application Priority Data

Dec. 9, 1992 [DE] Fed. Rep. of Germany ....... 4241386

[51] Int. Cl.[5] .............................................. B65G 37/00

[52] U.S. Cl. ................................ 198/692; 198/803.14

[58] Field of Search ............................. 412/17, 38-40, 412/42, 43; 198/688.1, 692, 468.6, 803.11, 803.12, 803.14, 801

[56] References Cited

U.S. PATENT DOCUMENTS 4,157,821 6/1979 Fabrig ............................. 412/42 X
4,232,858 11/1980 Fabrig ............................. 412/39 X
4,237,568 12/1980 Kunzmann ........................ 412/39 X

*Primary Examiner*—D. Glenn Dayoan
*Attorney, Agent, or Firm*—Chilton, Alix & Van Kirk

[57] ABSTRACT

A conveyor for use with a machine which applies covers to books of the type where the individual pages are loosely bound by means of mechanical binder elements having rounded teeth. The conveyor includes multiple saddle plates, coupled to endless chains, which are caused to move into engagement with the bound batches of pages. The saddle plates are provided with serrated leading edge portions which fit between the teeth of the binding elements to accurately position the bound pages relative to the saddle plates.

9 Claims, 1 Drawing Sheet

METHOD OF AND APPARATUS FOR TRANSPORTING LOOSELY BOUND BOOKS

BACKGROUND OF THE INVENTION

1. Field of Invention

The present invention relates to the transporting of books during an intermediate stage of the production thereof and particularly to the conveying of batches of previously ordered paper sheets, the sheets being interconnected by mechanical binders, to a position where covers are applied thereto. More specifically, the present invention is directed to a conveyor mechanism which affords stable transport, to a cover application station, of batches of loose sheets which are retained in the order by means of mechanical binding elements. Accordingly, the general objects of the present invention are to provide novel and improved methods and apparatus of such character.

2. Description of the Prior Art

In the manufacture of books, conveyor mechanisms are employed to transport partially finished books between work stations. Often, as a book nears completion, the conveying thereof becomes more difficult. This is particularly true in the case of books that are comprised of loose sheets which are provided with a series of holes along one edge, the sheets being retained in prearranged order by means of generally round mechanical binding elements. Examples of "books" having such construction which must be transported to a cover application station are notebooks and calendars, such "books" often being provided with reinforced front and back end sheets. The binding elements employed in such "books" may be fabricated from wire or plastic. Thus, in the technique known in the trade as "comb" binding, a wire is formed into a linear array of parallel teeth, each tooth defining a double ring. Each of these double rings, at one end, has a short section of wire which extends diagonally with respect to the rings to interconnect the rings of each tooth. In the course of assembly of such a mechanically bound "book", a series of holes is punched in the batch of sheets, the teeth of the comb are passed through these holes, and the teeth are bent in the shape of a circle. The tips of the teeth extend into facing interstices in the binder, these interstices being left as a result of the formation of the teeth, so as to define a discontinuous, generally linear seam. Such a comb binding is indicated at 3 in application FIG. 1.

In accordance with an alternative mechanical binding technique, the binding element is fabricated from plastic and has a support section with teeth extending outwardly therefrom. After the teeth of such a plastic binding element have been inserted through the holes in the stacked sheets comprising the "book", the binding element is formed into a cylindrical shape and a seam is defined by abutting ends of cooperating teeth.

Batches of paper sheets held together by the above-described mechanical binding elements are often encased in a rigid book cover. This "casing-in" operation is performed by adhesively securing the end sheets of the "book" to the inside of the leaves of the book covers. In order to deliver the bound "book" to a casing-in machine, the "book" must be supported astride saddle plates of an endless conveyor. This, however, places the straight edge of the saddle plate under the round teeth of the binding element. The casing-in operation includes the application of paste to the end sheets of the "book" and the subsequent rolling of the cover onto the "book" by means of lateral pressure rollers. These rollers first move upwardly, while engaged with the cover, and then change direction and roll the book cover onto the "book".

The lack of stability of a mechanically bound "book" on a saddle plate presents a problem of long standing in the art. This problem manifests itself in the possibility of relative movement between the edge of the saddle plate and the round teeth of the binding element, any such movement resulting in the end sheets of the "book" not contacting the book cover at right angles or the lateral distances being uneven. Also, the binding elements often cannot be made parallel to the backs of the book covers. Any such misalignment results in an unacceptable product.

SUMMARY OF THE INVENTION

The present invention overcomes the above-briefly discussed and other deficiencies and disadvantages of the prior art by providing a novel and improved conveyor particularly well suited for use with a casing-in machine of a book production facility. A conveyor in accordance with the present invention will include a significant number of saddle plates which are coupled to the endless chains of a rotary drive. These saddle plates are provided with positioning means that are sized and shaped to fit between the ring-like teeth of a mechanical binding element.

BRIEF DESCRIPTION OF THE DRAWINGS

The present invention may be better understood and its numerous objects and advantages will become apparent to those skilled in the art by reference to the accompanying drawing wherein like reference numerals refer to like elements in the two figures and which.

DESCRIPTION OF THE DISCLOSED EMBODIMENT

Figure 1:
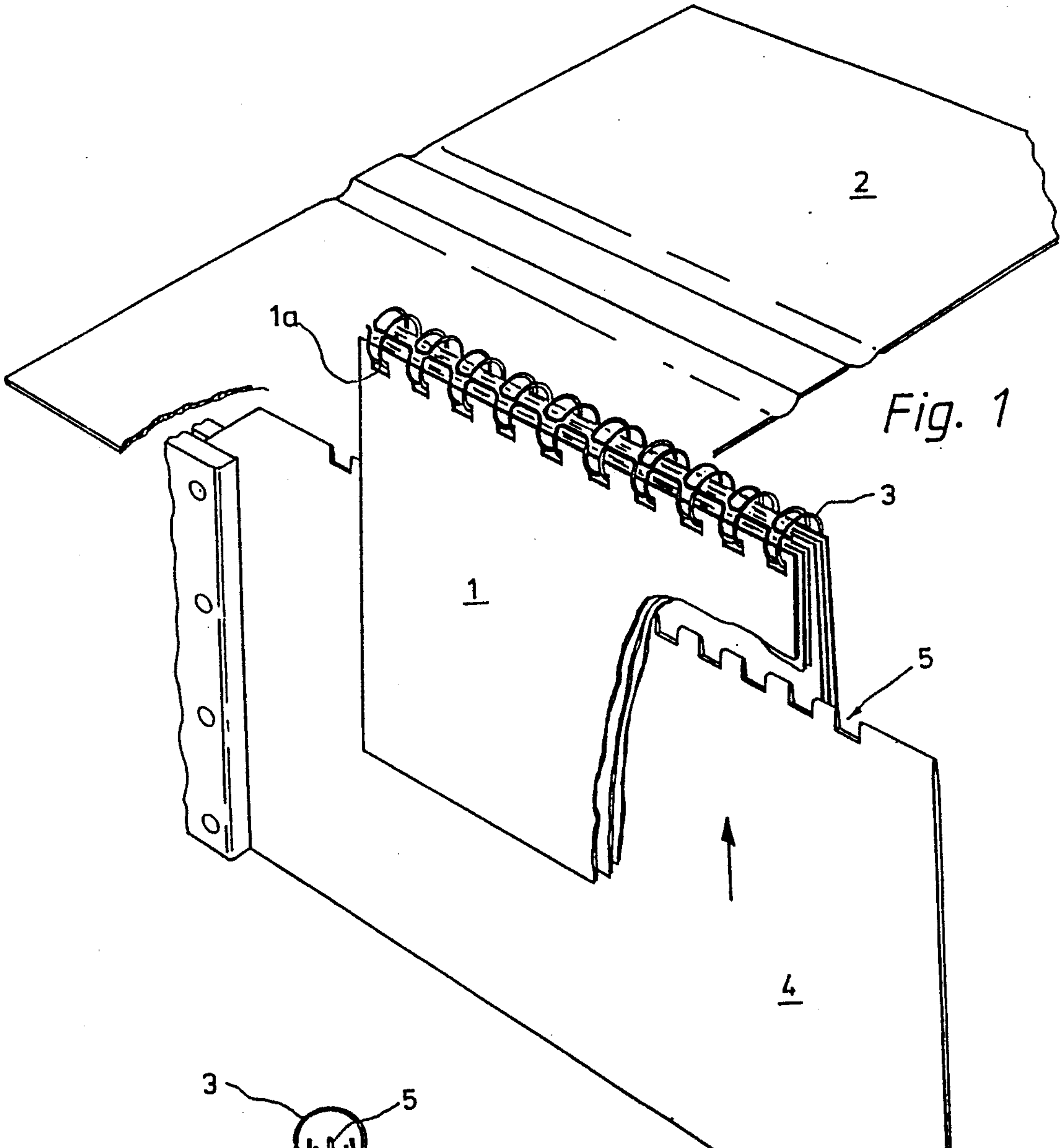
FIG. 1 is a partial perspective view of a conveyor in accordance with the invention, FIG. 1 depicting a saddle plate immediately prior to its engagement with a mechanically bound book.

With reference now to the drawing, a batch of loose paper which defines an unfinished book is indicated at 1. Each of the sheets of paper comprising the book 1 is provided, adjacent an edge, with a linear array of holes 1*a*. The sheets comprising the book 1 are loosely bound together via the aligned arrays of holes by means of a mechanical binding element 3 which, in the disclosed embodiment, is a wire comb having teeth which define double rings. As briefly discussed above in the Description of the Prior Art, the teeth of the binding element 3 are inserted through the holes 1*a* and subsequently bent into the circular shape which may be seen by joint consideration of FIGS. 1 and 2.

The conveying mechanism of the present invention comprises a rotary-driven conveyor having a large number of saddle plates 4 coupled to endless chains. In accordance with the invention, the saddle plates 4 are each provided with a serrated leading edge, indicated generally at 5, defined by a plurality of spatially displaced teeth. These teeth are sized and shaped to fit between the ring-shaped teeth of the comb-like binding element 3. Accordingly, when the saddle plate 4 moves upwardly into engagement with the book, as clearly shown in FIG. 2, the teeth of the serrated edge thereof will fit between the teeth of the binding element and the book will be securely and accurately transported so that it may be brought into precise alignment with the book cover 2.

Figure 2:
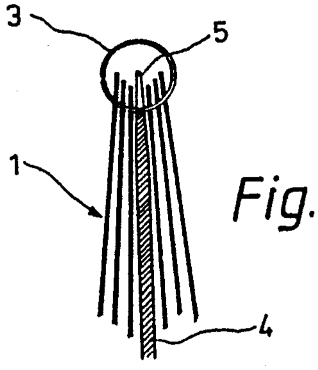
FIG. 2 is an enlarged, partial cross-sectional view of the saddle plate of FIG. 1, FIG. 2 depicting the saddle plate in engagement with the bound batch of sheets comprising the book.

Also in accordance with the preferred embodiment, and as best seen from FIG. 2, the teeth provided in the leading edge of the saddle plates, in the edge region thereof which is inserted between the teeth of the binding element, are generally wedge-shaped. Thus, the side faces of the teeth on the saddle plate are angled so as to converge towards the tips thereof. Also, the ends or tips of the saddle plate teeth are rounded.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In a conveyor for use with a casing-in machine of a book manufacturing operation, the conveyor having multiple saddle plates, the saddle plates intercepting books comprised of plural loose sheets, each sheet having an array of holes along one edge and the holes of all of the sheets being generally aligned, the loose sheets being retained in an assembled condition by a single mechanical binding member having plural curved teeth which extend through the aligned holes in the sheets, the improvement comprising:

positioning means on the leading edge of each of said saddle plates, said positioning means engaging a book in regions located between the teeth of the binding member whereby the possibility of relative movement between the saddle plate and book subsequent to such engagement is minimized.

2. The apparatus of claim 1 wherein said positioning means comprises a series of spaced projections in the leading edge of each of said saddle plates.

3. The apparatus of claim 2 wherein said projections are provided with rounded leading edges.

4. The apparatus of claim 2 wherein said projections are generally wedge-shaped.

5. The apparatus of claim 3 wherein said projections are generally wedge-shaped.

6. The apparatus of claim 2 wherein said projections are distributed over the entire length of each of said saddle plates.

7. The apparatus of claim 3 wherein said projections are distributed over the entire length of each of said saddle plates.

8. The apparatus of claim 4 wherein said projections are distributed over the entire length of each of said saddle plates.

9. The apparatus of claim 5 wherein said projections are distributed over the entire length of each of said saddle plates.

* * * * *